United States Patent [19]

Richardson, Jr. et al.

[11] Patent Number: 5,088,438
[45] Date of Patent: Feb. 18, 1992

[54] APPARATUS FOR FLEXIBLE MARINE WINDOWS

[75] Inventors: Jay Richardson, Jr.; Dolores Decker, both of Riviera Beach, Fla.

[73] Assignee: Glass Partners, Inc., Riviera Beach, Fla.

[21] Appl. No.: 500,523

[22] Filed: Mar. 28, 1990

[51] Int. Cl.$^5$ .............................................. B63B 17/00
[52] U.S. Cl. ........................................ 114/361; 135/88
[58] Field of Search .................. 135/87, 88; 114/343, 114/361; 296/100

[56] References Cited

U.S. PATENT DOCUMENTS

| | | | |
|---|---|---|---|
| 4,671,203 | 6/1987 | Sanburg | 114/361 |
| 4,683,901 | 8/1987 | Mitchell | 114/361 |
| 4,694,774 | 9/1987 | Keithley | 114/361 |
| 4,940,009 | 7/1990 | Keithley | 114/361 |

Primary Examiner—Joseph F. Peters, Jr.
Assistant Examiner—Stephen P. Avila
Attorney, Agent, or Firm—Eckert, Seamans, Cherin & Mellott

[57] ABSTRACT

An apparatus to prevent singeing of flexible plastic windows in contact with hot supporting framework members includes connecting structure adapted to engage the framework members. An insulator is fixed to the connecting structure so as to be interposed between the flexible plastic window and the framework members. The insulator will prevent contact between the flexible plastic window and the hot framework members to prevent singeing of the flexible plastic window.

11 Claims, 4 Drawing Sheets

APPARATUS FOR FLEXIBLE MARINE WINDOWS

BACKGROUND OF THE INVENTION

1. Field of the Invention

The present invention relates generally to marine apparatus, and more particularly to apparatus for marine canvas and other flexible shelters.

2. Description of the Prior Art

Many marine vessels utilize canvas and other flexible materials as a temporary shelter. Windows made of a clear, flexible plastic are often provided with the canvas, or as an alternative to canvas, to improve visibility. The plastic windows and canvas are commonly supported by a framework which usually is made of a non-corrosive material such as aluminum or stainless steel. On days when the sun is strong or the temperature is high, the metal framework is known to become very hot. The plastic windows sometimes touch the hot metal framework and singe due to the high temperature of the metal. The clear plastic becomes discolored and damaged. This damage to the plastic window is unsightly, can cause cracking, and is costly to repair.

Inventions intended to solve this problem have included mesh-like material that is adapted to fit over and cover the metal framework. The mesh-like material is intended to prevent direct contact between the plastic windows and the hot metal. The mesh-like material must be fitted for, and attached to, each particular framework, and can be quite burdensome to install. All canvases, including the canvas top, must be removed from the framework to install the mesh over the entire framework and its fittings. It would be desirable to provide an alternative apparatus to separate the plastic windows from the hot framework members.

SUMMARY OF THE INVENTION

It is an object of the invention to prevent singeing of flexible marine windows.

It is also an object of the invention to provide apparatus which will prevent singeing of flexible marine windows, and which is easy to install and remove.

It is another object of the invention to provide apparatus which will prevent singeing of flexible marine windows, and which is relatively low in cost.

These and other objects are accomplished by apparatus having connecting structure adapted to attach to the framework members which support marine canvas and other temporary, flexible marine shelters having plastic portions, and particularly clear plastic windows. An insulator is joined to the connecting structure and is adapted to prevent contact between the flexible plastic windows and the supporting framework. The supporting framework can reach very high temperatures, however, the insulator remains at a temperature which will not damage the flexible plastic windows when the windows contact the insulator. Apparatus according to the invention can be attached at spaced intervals on the supporting framework, so as to prevent the flexible plastic windows from touching the framework along the length thereof.

The connecting structure can be selected from several suitable constructions. The connecting structure should provide detachable yet secure means for attaching to the supporting framework. The connecting structure should be made of a non-corrosive material which can withstand prolonged exposure to the marine environment and intense sunlight. The connecting structure should be easy to install and low in cost. A preferred embodiment for the connecting structure is a clip.

The insulator can be selected from many different materials. The insulator should be of material that does not heat substantially in direct sun, to prevent the insulator from singeing the flexible plastic windows. The insulator should not include rough or sharp surfaces, or other surfaces which would damage or chafe the flexible plastic windows. The insulator should also be durable and able to withstand wear and abrasion. The insulator should be of a non-corrosive material capable of withstanding prolonged exposure to the marine environment. A presently preferred material for the insulator is leather.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENT

Figure 1:
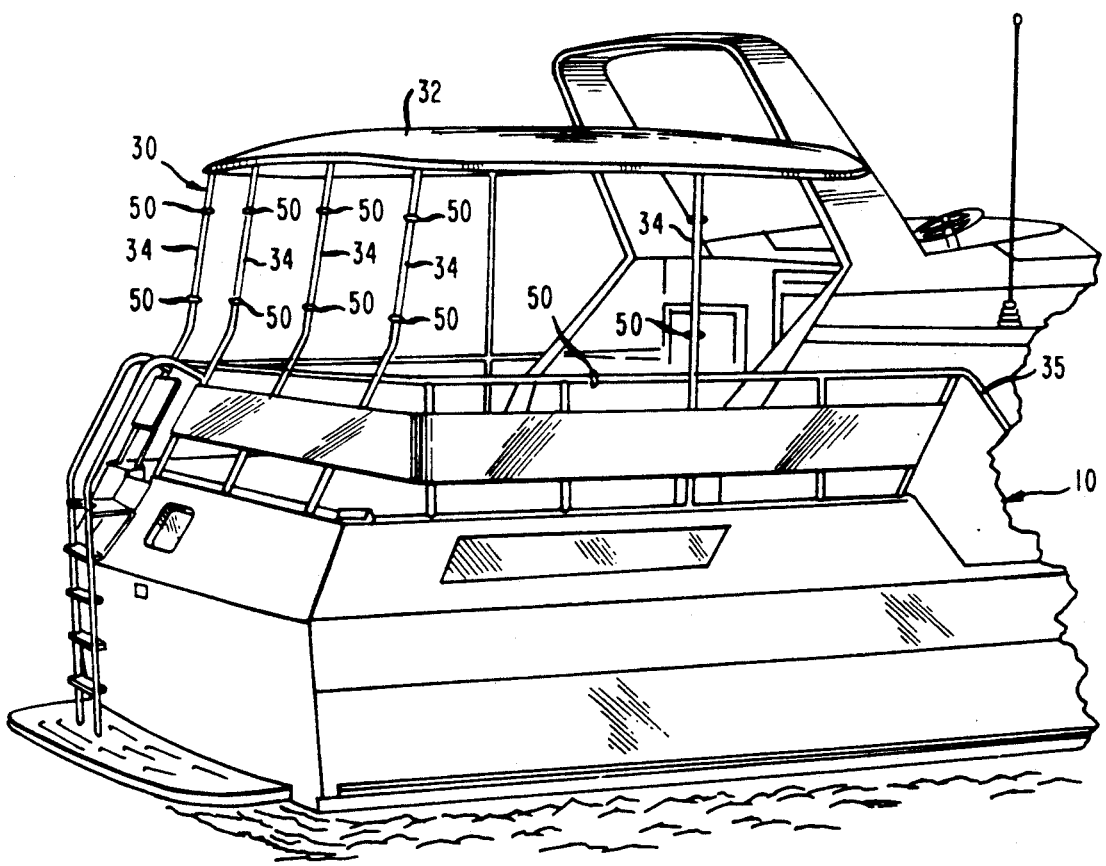
FIG. 1 is a perspective view of a marine vessel having a supporting framework for a flexible shelter.
Figure 2:
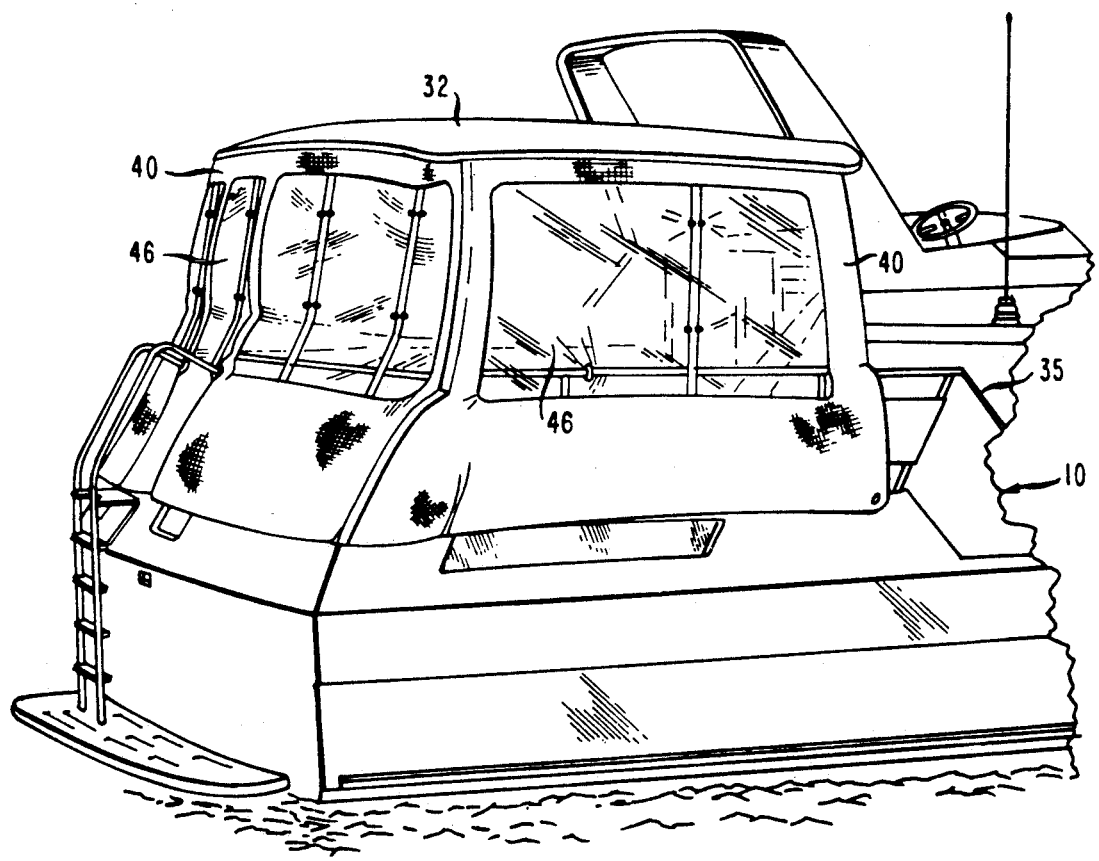
FIG. 2 is a perspective view of a marine vessel having a flexible shelter.

There is shown in FIGS. 1-2 a marine vessel 10 having a supporting framework 30 which supports a temporary shelter, such as a marine canvas roof 32. The framework 30 can be formed from a variety of different constructions, but will commonly consist of a plurality of spaced framework members 34 which can be positioned in a variety of spatial orientations to form the supporting framework 30. The framework members 34 are connected to the vessel by suitable structure and can be interconnected to form a rigid support for the canvas or other flexible shelter material. The supporting framework 30 is typically constructed from a durable material such as aluminum or stainless steel. A side railing 35 and other metal hardware may also be present.

The vessel 10 is shown in FIG. 2 with canvas side panels 40 in place as a temporary shelter. The canvas side panels 40 are provided with flexible plastic windows 46. It is alternatively possible that the side panels 40 would be made entirely of clear plastic for improved visibility. The side panels 40 can be connected at a top edge thereof to the roof 32 by suitable detachable fastening means such as snaps, zippers or awning track, and can alternatively be attached permanently to the roof 32. Side panels 40 can also be connected to portions of the marine vessel 10 along side and bottom edges of the panels, to secure the panels in place. The flexible plastic windows 46 will sometimes contact the supporting framework 30. The supporting framework 30 as well as other metal hardware on the vessel 10 can become quite hot when the sun is strong or where ambient temperatures are high. The flexible plastic windows 46 are known to singe upon contact with the framework 30 due to the high temperatures of the framework members 34.

Figure 3:
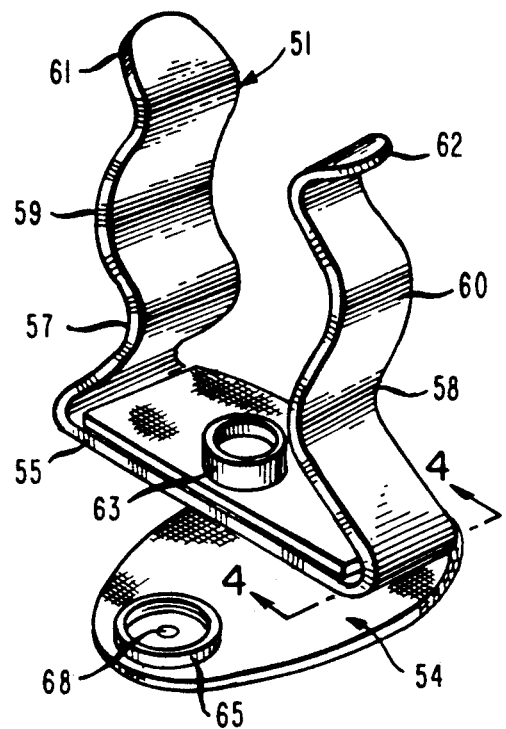
FIG. 3 is a perspective view of marine apparatus according to the invention, and in a first stage of assembly.
Figure 4:
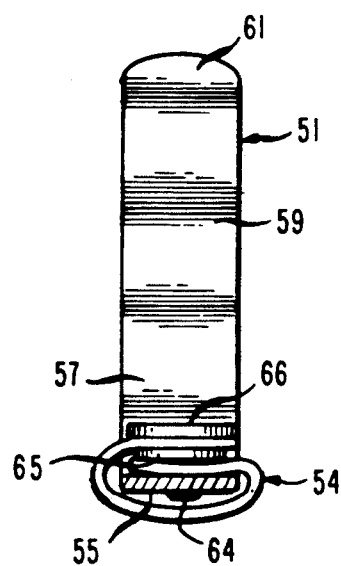
FIG. 4 is a cross-section taken along lines 4—4 in FIG. 3, and in a second stage of assembly.

Preferred apparatus according to the invention is shown in FIGS. 3 and 4. The apparatus 50 preferably includes connecting structure 51 and an insulator 54. The apparatus 50 is adapted to space the flexible plastic windows 46 from the supporting framework 30. The insulator 54 is constructed of a material which remains at a temperature which will not damage the flexible plastic windows 46, even in direct sunlight. The flexible plastic windows 46 contact the insulator 54 and do not touch the hot supporting framework 30.

The connecting structure 51 can be formed from any of several suitable constructions that are adapted to engage the supporting framework 30, and preferably the connecting structure is a clip. The insulator 54 can be attached directly to the connecting structure 51 by suitable fastening means, including bonding with adhesives. Alternatively, it is possible to integrally form the connecting structure 51 and insulator 54, as by injection molding of plastic compounds.

The clip can be formed from several suitable constructions, preferably including attachment flanges 57 and 58 and a support portion 55 spanning between ends of the attachment flanges 57 and 58. The attachment flanges 57 and 58 are adapted to resiliently engage the framework members 34, and can be of any suitable shape depending in part on the shape of the framework members 34 that must be engaged. The attachment flanges 57 and 58 can include cylindrical, curved portions 59, 60, respectively, where cylindrical framework members must be engaged. Ends 61, 62 of the attachment flanges 57 and 58 can be flared outward to facilitate the attachment of the apparatus 50 to the framework members 34. A plastic material can be used to coat at least inside surfaces of the attachment flanges 57 and 58 to further prevent scratching of the framework members when the clip is installed.

The insulator 54 can be made of several suitable materials. The material should remain near ambient temperatures in intense sunlight. The material should be durable and able to withstand prolonged exposure to the marine environment and intense sunlight. The material should not have a rough texture which could possibly cut or scratch the flexible plastic windows 46. A presently preferred material for the insulator is leather. Plastics and rubber compounds are also possible materials for the insulator 54.

The insulator 54 can be attached to the support portion 55 by any suitable means, including adhesives. In a preferred embodiment, the insulator 54 is provided as an elongated strip of material. A male stud member 63 is provided at one end of the insulator 54 and secures the end to the support portion 55 by suitable fastening means such as the rivet portion 64 of the male stud member 63. A female socket member 65 is provided at an end of the insulator 54 opposite to the male stud member 63. A button 66 having a stem 68 is secured to the female socket member 65 through the insulator material by passing the stem 68 through an aperture in the button 66, and flaring the end of the stem 68 to secure the female socket member 65 to the insulator 54. The elongated strip comprising the insulator 54 is then wrapped around the support portion 55 and the female socket member 65 is connected to the male stud member 63. The button 66 should be spaced from the framework member 34 when the apparatus 5 is attached to avoid vibration noises. Other attachment structure for the male stud and female socket is possible.

Figure 5:
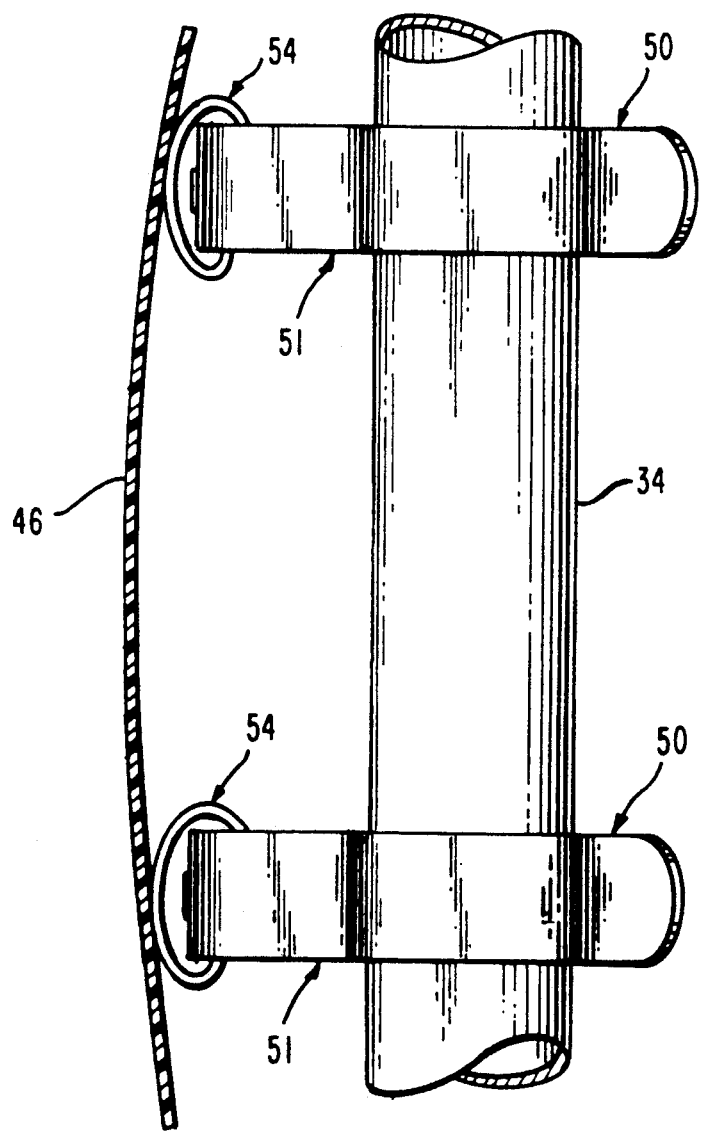
FIG. 5 is a side elevation, partially in cross-section, of marine apparatus according to the invention as installed on a supporting framework.

Referring to FIG. 5, the apparatus 50 is shown as attached to a framework member 34. The apparatus 50 should be adapted to space the window 46 from the framework member 34 a sufficient distance to insure against contact, preferably between about one-half and one inch. The flexible plastic window 46 contacts the insulator 54 and does not contact the hot framework member 34. The apparatus 50 can be readily detached from the framework member 34 due to the resilient engagement thereof, and moved to other vessels, or other parts of the vessel 10, as may be necessary.

The invention is capable of taking several alternative embodiments without departing from the spirit or essential attributes thereof. Particularly, it is possible to alternatively construct the connecting structure by which the insulator 54 is engaged to the framework members 34. Clamps, clasps, buckles and the like may all be utilized as an alternative to the clip described herein for engaging the framework members 34. The clip, where utilized, can be formed in several alternative configurations to adapt to the particular framework members 34 that must be engaged. The attachment structure may be made from several alternative materials, including metals and plastic. Where plastic or another material having insulating properties is utilized, it is possible to form the connecting structure integrally with the insulator by suitable molding or other manufacturing processes. It is also possible to utilize the invention wherever flexible plastic windows contact a hot supporting framework, as may be the case in recreational vehicles, tents, and the like. Reference should accordingly be had to the following claims, rather than to the foregoing specification, as indicating the scope of the invention.

We claim:

1. A method for preventing singeing of flexible plastic shelters for marine vessels, said shelters being supported by framework members, said method comprising the attachment to said framework members of at least one detachable clip, said clip being adapted to engage said framework members and having at least one insulator portion, and further comprising the step of interposing said insulating portion between said flexible plastic shelter and said framework members, whereby a plurality of said clips can be attached to said framework members in spaced-apart relation to prevent contact between said flexible plastic shelter and said framework members, whereby singeing of said flexible plastic shelter upon contact with said framework members will be prevented.

2. Apparatus to prevent singeing of flexible plastic windows in contact with supporting framework members, said apparatus comprising:

connecting structure adapted to engage said framework members, said connecting structure comprising a clip, said clip being substantially U-shaped and comprising opposing attachment flanges connected at an end thereof by a support member, said attachment flanges being adapted to resiliently engage said framework members; and, an insulator fixed to said connecting structure so as to be interposed between said flexible plastic window and said framework members when said connecting structure is engaged to said framework members, said insulator being provided as an elongated strip wrapped about and engaged to said support member, a first end of said elongated strip being engaged to said support member and including a first fastening member, and an opposite end of said elongated strip comprising a second fastening member, said second fastening member being adapted to operatively engage said first fastening member, whereby said elongated strip can be wrapped about said support member and said second fastening member can be engaged to said first fastening member to secure said elongated strip to said support member, whereby said insulator will prevent contact between said flexible plastic window and said hot framework member to prevent singeing of said flexible plastic window.

3. The apparatus of claim 2, wherein said first fastening member and said second fastening member comprise cooperating male stud and female socket structure.

4. The apparatus of claim 2, wherein said attachment flanges comprise curved portions adapted to mate with the sides of cylindrical framework members.

5. The apparatus of claim 2, wherein ends of said attachment flanges opposite to said support member are outwardly flared and coated with plastic to facilitate attachment to said framework member, and to prevent damage to said framework member.

6. The apparatus of claim 2, wherein said insulator comprises at least one of the group consisting of leather and plastic.

7. In a marine vessel having a flexible plastic window supported by one or more supporting framework members fixed to said vessel, the improvement comprising: apparatus having connecting structure for engaging said framework members, said connecting structure comprising a clip, said clip being substantially U-shaped and having opposing attachment flanges connected at ends thereof by a support member, said attachment flanges being adapted to resiliently engage said framework members, and an insulator adapted to be interposed between said flexible plastic windows and said framework members when said apparatus is engaged to said framework members, said insulator being provided as an elongated strip wrapped about and engaged to said support member, a first end of said elongated strip being engaged to said support member and including a first fastening member, and an opposite end of said elongated strip including a second fastening member, said second fastening member being adapted to operatively engage said first fastening member, whereby said elongated strip can be wrapped about said support member and said second fastening member can be engaged to said first fastening member to secure said elongated strip to said support member, and whereby contact between flexible plastic windows and said supporting framework members will be prevented.

8. The marine vessel of claim 7, wherein said first fastening member and said second fastening member comprise cooperating male stud and female socket structure.

9. The marine vessel of claim 7, wherein said attachment flanges comprise curved portions adapted to mate with the sides of cylindrical framework members.

10. The marine vessel of claim 7, wherein ends of said attachment flanges opposite to said support member are outwardly flared and coated with plastic to facilitate attachment to said framework members, and to prevent damage to said framework members.

11. The marine vessel of claim 7, wherein said insulator comprises at least one of the group consisting of leather and plastic.

* * * * *